(12) United States Patent
Lin et al.

(10) Patent No.: US 11,258,297 B2
(45) Date of Patent: Feb. 22, 2022

(54) INVERTER CONTROL STRATEGY FOR A TRANSIENT HEAVY LOAD

(71) Applicant: SCHNEIDER ELECTRIC IT CORPORATION, Foxboro, MA (US)

(72) Inventors: Wei-Hsiang Lin, Shanghai (CN); Xiaojun Wang, Shanghai (CN); Yongshuai Bao, Shanghai (CN)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 17/111,627

(22) Filed: Dec. 4, 2020

(65) Prior Publication Data

US 2021/0203183 A1 Jul. 1, 2021

Related U.S. Application Data

(60) Provisional application No. 62/954,718, filed on Dec. 30, 2019.

(51) Int. Cl.
*H02J 9/06* (2006.01)
*H02M 7/537* (2006.01)

(52) U.S. Cl.
CPC .............. *H02J 9/062* (2013.01); *H02J 9/061* (2013.01); *H02M 7/537* (2013.01)

(58) Field of Classification Search
CPC .......... H02J 9/062; H02J 9/061; H02M 7/537; H02M 3/156; H02M 1/32
See application file for complete search history.

(56) References Cited

U.S. PATENT DOCUMENTS

| 9,088,232 | B2 | 7/2015 | Marcinkiewicz et al. |
| 2007/0247004 | A1* | 10/2007 | Tan ............... H02J 1/10 307/66 |
| 2014/0368043 | A1* | 12/2014 | Colombi ............ H02J 3/1842 307/66 |

FOREIGN PATENT DOCUMENTS

| JP | H0281342 | * 10/1992 |
| JP | H04281342 A | 10/1992 |
| WO | 2010105033 A1 | 9/2010 |

OTHER PUBLICATIONS

Extended European Search Report from corresponding European Application No. 20214368.1 dated Jun. 17, 2021.

* cited by examiner

*Primary Examiner* — Toan T Vu
(74) *Attorney, Agent, or Firm* — Lando & Anastasi, LLP

(57) ABSTRACT

A power converter system including a DC bus, a DC/DC converter coupled to the DC bus, an inverter coupled to the DC bus and configured to convert DC power from the DC bus into output AC power having an output current, an output coupled to the inverter and configured to provide the output AC power to a load, and at least one controller configured to identify an impending high-load transient state at the output, and in response to identifying the impending high-load transient state, reduce a peak value of the output current of the output AC power by operating the DC/DC converter to reduce a voltage level on the DC bus and increasing a duty cycle of the inverter.

23 Claims, 5 Drawing Sheets

INVERTER CONTROL STRATEGY FOR A TRANSIENT HEAVY LOAD

CROSS-REFERENCE TO RELATED APPLICATIONS

This application claims priority under 35 U.S.C. § 119(e) to U.S. Provisional Patent Application Ser. No. 62/954,718 titled INVERTER CONTROL STRATEGY FOR A TRANSIENT HEAVY LOAD, filed Dec. 30, 2019, which is incorporated by reference herein in its entirety.

BACKGROUND

1. Field of Invention

The present disclosure relates generally to power converter systems.

2. Discussion of Related Art

The use of power converter systems, such as uninterruptible power supplies (UPS), to provide regulated, uninterrupted power for sensitive and/or critical loads, such as computer systems and other data processing systems, is known. Known power converter systems include online UPS's and offline UPS's, as well as others. Online UPS's provide conditioned AC power as well as back-up AC power upon interruption of a primary source of AC power. Offline UPS's typically do not provide conditioning of input AC power, but do provide back-up AC power upon interruption of the primary AC power source. Both on-line and off-line UPS's typically include an inverter to convert DC power derived from the primary and/or backup power sources into output AC power.

SUMMARY

At least one aspect of the present disclosure is directed to a power converter system including a DC bus, a DC/DC converter coupled to the DC bus, an inverter coupled to the DC bus and configured to convert DC power from the DC bus into output AC power having an output current, an output coupled to the inverter and configured to provide the output AC power to a load, and at least one controller configured to identify an impending high-load transient state at the output, and in response to identifying the impending high-load transient state, reduce a peak value of the output current of the output AC power by operating the DC/DC converter to reduce a voltage level on the DC bus and increasing a duty cycle of the inverter.

In one embodiment, the DC/DC converter is coupled to a backup power source and is configured to provide DC power to the DC bus derived from the backup power source. In some embodiments, the power converter system includes an input configured to receive input power and a converter configured to convert the input power into DC power and provide the DC power to the DC bus. In certain embodiments, the at least one controller is configured to operate the power converter system in a first mode of operation by controlling the converter to provide DC power to the DC bus derived from the input power and a second mode of operation by controlling the DC/DC converter to provide DC power to the DC bus derived from the backup power source. In various embodiments, the high-load transient state at the output occurs during a transition of the power converter system between the first and second modes of operation.

In some embodiments, the at least one controller is configured to reduce the peak value of the output current to prevent the backup power source from exceeding a maximum current limit of the backup power source during the high-load transient state. In one embodiment, the high-load transient state at the output occurs during a cold-boot of the power converter system, the backup power source being configured to provide DC power to the DC bus during the cold-boot to support the load. In various embodiments, the at least one controller is configured to determine that the high-load transient state has passed, and in response to determining that the high-load transient state has passed, increase the peak value of the output current by operating the DC/DC converter to increase the voltage level on the DC bus and reducing the duty cycle of the inverter. In certain embodiments, the at least one controller is configured to determine that the high-load transient state has passed by detecting that a predetermined amount of time has elapsed since identifying the impeding high-load transient state.

In various embodiments, the predetermined amount of time corresponds to a predetermined number of periods of the output AC power. In one embodiment, the at least one controller is configured to operate the DC/DC converter and the inverter to maintain a substantially constant RMS value of the output current while the peak value of the output current is reduced. In some embodiments, the power converter system is an Uninterruptible Power Supply (UPS).

Another aspect of the present disclosure is directed to a non-transitory computer-readable medium storing thereon sequences of computer-executable instructions for controlling a power converter system including a DC bus, a DC/DC converter coupled to the DC bus, and an inverter coupled to the DC bus. The sequences of computer-executable instructions include instructions that instruct at least one processor to identify an impending high-load transient state at an output of the power converter system, and operate, in response to identifying the impending high-load transient state, the DC/DC converter to reduce a voltage level on the DC bus and the inverter with an increased duty cycle to reduce a peak value of an output current of the power converter system.

In one embodiment, the sequences of instructions include instructions that cause the at least one processor to determine that the high-load transient state has passed, and operate, in response to determining that the high-load transient state has passed, the DC/DC converter to increase the voltage level on the DC bus and the inverter with a reduced duty cycle to increase the peak value of the output current. In some embodiments, the sequences of instructions include instructions that cause the at least one processor to determine that the high-load transient state has passed by detecting that a predetermined amount of time has elapsed since identifying the impeding high-load transient state. In various embodiments, the predetermined amount of time corresponds to a predetermined number of periods of the output AC power. In certain embodiments, the sequences of instructions include instructions that cause the at least one processor to operate the DC/DC converter and the inverter to maintain a substantially constant RMS value of the output current while the peak value of the output current is reduced.

In some embodiments, the sequences of instructions include instructions that cause the at least one processor to operate, in a first mode of operation, a converter to provide DC power to the DC bus derived from input power received at an input of the power converter system, and operate, in a second mode of operation, the DC/DC converter to provide DC power to the DC bus derived from backup DC power provided by a backup power source. In one embodiment, the sequences of instructions include instructions that cause the at least one processor to identify an impending high-load transient state at the output corresponding to an upcoming transition of the power converter system between the first and second modes of operation. In various embodiments, the sequences of instructions include instructions that cause the at least one processor to control the power converter system to operate in the second mode of operation during a cold-boot of the power converter system to support a load coupled to the output. In certain embodiments, the sequences of instructions include instructions that cause the at least one processor to identify an impending high-load transient state at the output corresponding to an upcoming cold-boot of the power converter system.

Another aspect of the present disclosure is directed to an Uninterruptible Power Supply (UPS). The UPS includes an input configured to receive input AC power, an output configured to provide output AC power having an output current to a load, a backup power input configured to receive backup DC power from a backup power source, a DC/DC converter coupled to the backup power input and configured to convert the backup DC power into DC power, a DC bus coupled to the DC/DC converter and configured to receive DC power from the DC/DC converter, an inverter coupled to the output and configured to convert DC power from the DC bus into the output AC power, and at least one controller configured to identify an impending high-load transient state at the output, and in response to identifying the impending high-load transient state, reduce a peak value of the output current of the output AC power by operating the DC/DC converter to reduce a voltage level on the DC bus and increasing a duty cycle of the inverter.

In one embodiment, the DC/DC converter is configured to convert the backup DC power into DC power having one of a first voltage level and a second voltage level, the first voltage level being lower than the second voltage level. In some embodiments, the inverter is configured to operate with at least a first duty cycle and a second duty cycle, the first duty cycle being higher than the second duty cycle. In certain embodiments, operating the DC/DC converter to reduce the voltage level on the DC bus includes controlling the DC/DC converter to provide DC power having the first voltage level and increasing the duty cycle of the inverter includes controlling the inverter to operate with the first duty cycle.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, power converter systems, such as uninterruptible power supplies (UPS), often include inverters used to provide regulated, uninterrupted power to sensitive and/or critical loads. For example, an offline UPS connects a load directly to utility power when mains power is available and sufficient to power a load. When utility power is unavailable or insufficient to power the load, the offline UPS operates a DC/AC inverter to convert DC power from a backup power source into desired AC power, which is provided to the load. Likewise, when mains power is available and sufficient to power a load, an online UPS operates a DC/AC inverter to provide conditioned AC power, derived from mains power, to the load. When utility power is unavailable or insufficient to power the load, the online UPS operates the DC/AC inverter to provide conditioned AC power, derived from a backup power source, to the load.

Figure 1:
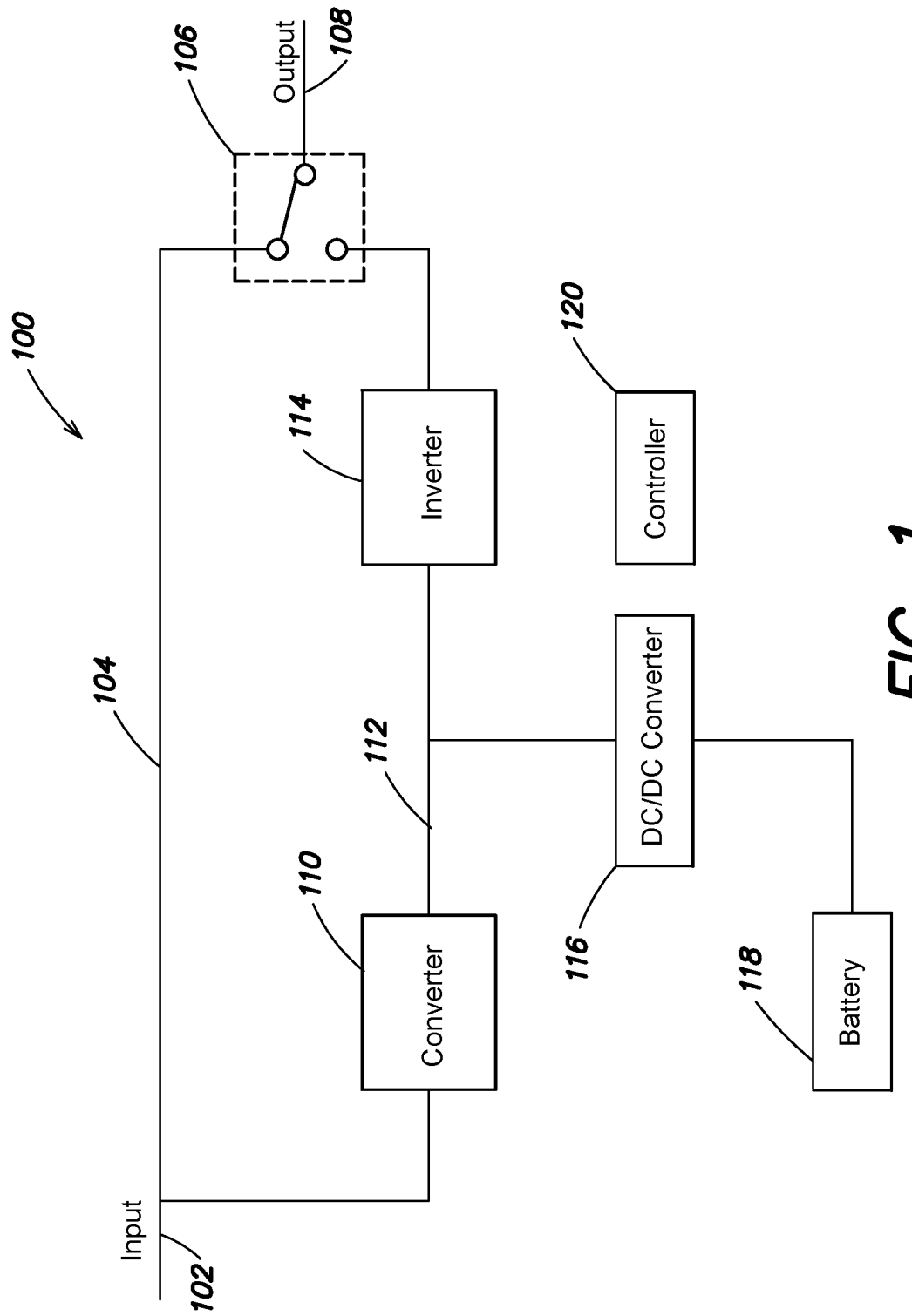
FIG. 1 is a functional block diagram of a power converter system in accordance with aspects described herein.

For example, FIG. 1 is a block diagram of one embodiment of a power converter system 100. In one example, the power converter system 100 is configured as an offline UPS. The power converter system 100 includes an input 102, a bypass line 104, an output switch 106, an output 108, a converter 110, a DC bus 112, an inverter 114, and a DC/DC converter 116. In one example, the DC bus 112 may include a plurality of voltage rails (e.g., a positive rail, negative rail, etc.). In some examples, the power converter system 100 may include a battery 118; however, in other examples the battery 118 may be external to the power converter system 100. In addition, a controller 120 may be included in the power converter system 100. In one example, the controller 120 may be coupled to and configured to operate the output switch 106, the converter 110, the inverter 114, and the DC/DC converter 116. In certain examples, the controller 120 may be external to the power converter system 100.

The input 102 is coupled to the bypass line 104 and the converter 110. The output 108 is coupled to the bypass line 104 and the inverter 114 via the output switch 106. The converter 110 is coupled to the input 102 and the DC bus 112. The DC/DC converter 116 is coupled to the DC bus 112 and the battery 118. In some examples, the DC bus 112 includes at least one DC bus capacitor. The inverter 114 is coupled to the DC bus 112 and the output switch 106.

The power converter system 100 is generally configured to operate in one of at least two modes of operation, including a line mode and a battery mode. The mode of operation of the power converter system 100 is dependent upon a quality level of AC power received at the input 102 (for example, from a utility mains AC power supply). For example, when the AC power received at the input 102 is acceptable (i.e., within a specified range of acceptable electrical parameters), the power converter system 100 may be configured to operate in the line mode. Otherwise, when the AC power received at the input 102 is not acceptable (i.e., not within a specified range of acceptable electrical parameters), the power converter system 100 may be configured to operate in the battery mode. In some examples, the controller 120 may be coupled to the input 102 and configured to monitor the input 102 to determine whether to operate the power converter system 100 in the line mode or the battery mode.

In the line mode, the output switch 106 is controlled such that the bypass line 104 is coupled to the output 108. The input 102 receives AC power from an external source (for example, from a utility mains AC power supply) and provides the received power to the output 108 and to the converter 110. The output 108 receives the power from the input 102 and provides the power to an external load (not shown). In the line mode, the converter 110 can receive the AC power from the input 102, convert the AC power into DC power, and provide DC power to the DC/DC converter 116 to charge the battery 118.

When acceptable AC power is not available at the input 102, the power converter system 100 operates in battery mode. In the battery mode, the output switch 106 is controlled such that the inverter 114 is coupled to the output 108. The converter 110 discontinues charging the battery 118, and the battery 118 discharges stored DC power to the DC/DC converter 116. The DC/DC converter 116 regulates DC power received from the battery 118 and provides regulated DC power to the DC bus 112. The inverter 114 converts the received DC power to AC power and provides the AC power to the output 108 via the output switch 106 to provide electrical power to the external load.

In some examples, the power converter system 100 can be powered on in a cold-boot state. In one example, the cold-boot state corresponds to a state of the power converter system 100 in which the DC/DC converter 116 is configured to provide DC power derived from the battery 118 to the DC bus 112 to support the load immediately after power on. In certain examples, the power converter system 100 continues to operate in the cold-boot state until acceptable input AC power is detected. In other examples, the power converter system 100 is configured to transition out of the cold-boot state after a predetermined amount of time has elapsed.

Figure 2:
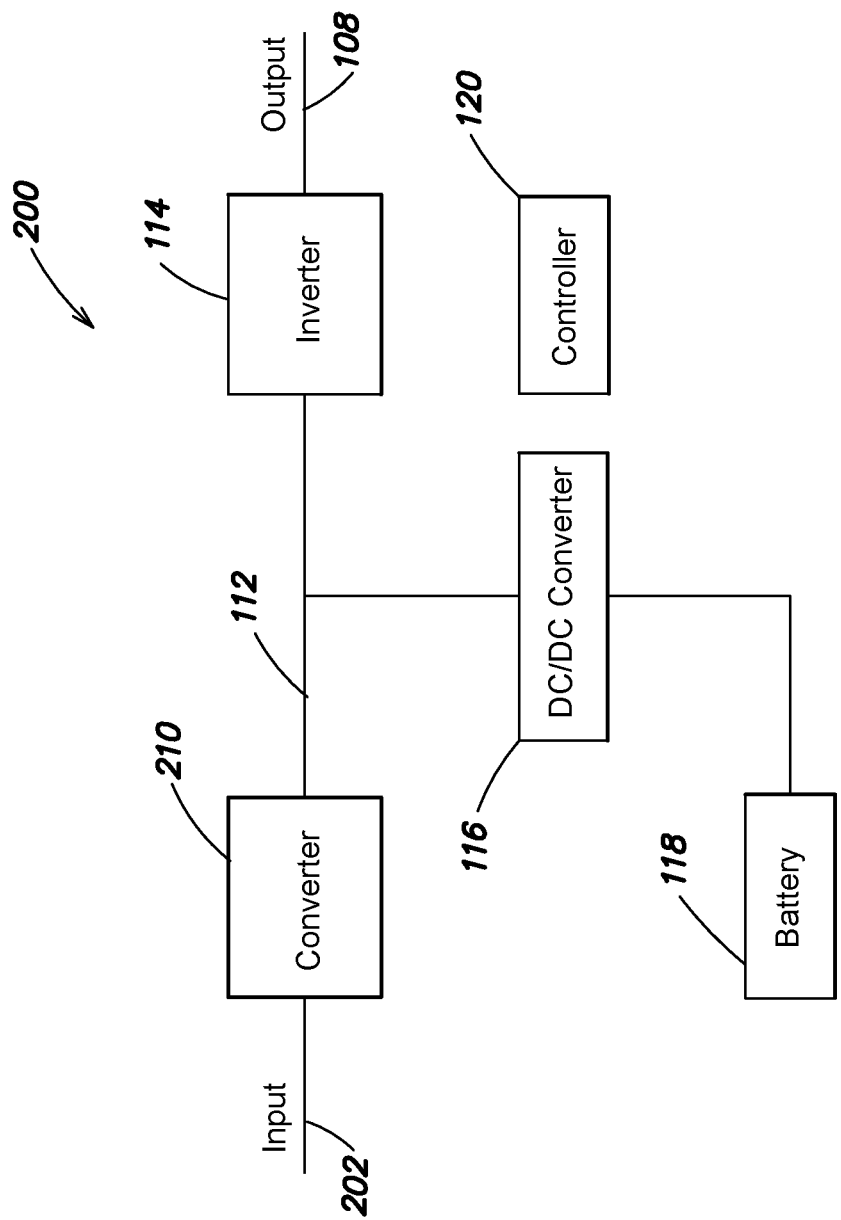
FIG. 2 is a functional block diagram of a power converter system in accordance with aspects described herein.

FIG. 2 is a block diagram of one embodiment of a power converter system 200. In one example, the power converter system 200 includes an input 202 and a converter 210. In addition, the power converter system 200 includes an output 108, a DC bus 112, an inverter 114, and a DC/DC converter 116 similar to the power converter system 100 of FIG. 1. The power converter system 200 may also include a battery 118; however, in other examples the battery 118 may be external to the power converter system 200. In addition, a controller 120 may be included in the power converter system 200. In one example, the controller 120 is coupled to and configured to operate the converter 210, the inverter 114, and the DC/DC converter 116. In certain examples, the controller 120 may be external to the power converter system 200.

In one example, the power converter system 200 can be configured as an online UPS. For example, the input 202 may receive AC power (for example, from a utility mains AC power supply). When the AC power received at the input 202 is acceptable, (i.e., within a specified range of acceptable electrical parameters), the power converter system 200 operates in an online mode. Otherwise, when the AC power received at the input 202 is not acceptable (i.e., not within a specified range of acceptable electrical parameters), the power converter system 200 operates in a battery mode. In some examples, the controller 120 is coupled to the input 202 and configured to monitor the input 202 to determine whether to operate the power converter system in the online mode or the battery mode.

In the online mode, the input 202 receives AC power from an external source (for example, from a utility mains AC power supply) and provides the received power to the converter 210. The converter 210 converts the AC power into DC power and provides the DC power to the DC bus 112. In some examples, the converter 210 may be configured as a Power Factor Correction (PFC) converter. The inverter 114 receives the DC power from the DC bus 112, converts the DC power into output AC power, and provides the output AC power to the output 108 to provide electrical power to an external load (not shown). In addition, during the online mode, the DC/DC converter 116 can charge the battery 118 using DC power derived from the DC bus 112.

When acceptable AC power is not available at the input 202, the power converter system 200 operates in battery mode. In the battery mode, the battery 118 discharges stored DC power to the DC/DC converter 116. The DC/DC converter 116 regulates DC power received from the battery 118 and provides regulated DC power to the DC bus 112. The inverter 114 converts the received DC power to AC power and provides the AC power to the output 108 to provide electrical power to the external load.

In another example, the power converter system 200 can be configured such that the input 202 receives DC power (for example, from a DC power source). When the DC power received at the input 202 is acceptable, (i.e., within a specified range of acceptable electrical parameters), the power converter system 200 operates in an online mode. Otherwise, when the DC power received at the input 202 is not acceptable (i.e., not within a specified range of acceptable electrical parameters), the power converter system 200 operates in a battery mode.

In the online mode, the input 202 receives DC power from an external source (for example, from a DC power source) and provides the received power to the converter 210. In one example, the converter 210 converts the DC power from a first voltage level to a second voltage level and provides the DC power to the DC bus 112. The inverter 114 receives the DC power from the DC bus 112, converts the DC power into output AC power, and provides the output AC power to the output 108 to provide electrical power to an external load (not shown). In addition, during the online mode, the DC/DC converter 116 can charge the battery 118 using DC power derived from the DC bus 112.

When acceptable DC power is not available at the input 202, the power converter system 200 operates in battery mode. In the battery mode, the battery 118 discharges stored DC power to the DC/DC converter 116. The DC/DC converter 116 regulates DC power received from the battery 118 and provides regulated DC power to the DC bus 112. The inverter 114 converts the received DC power to AC power and provides the AC power to the output 108 to provide electrical power to the external load.

In some examples, the power converter system 200 can be powered on in a cold-boot state. In one example, the cold-boot state corresponds to a state of the power converter system 200 in which the DC/DC converter 116 is configured to provide DC power derived from the battery 118 to the DC bus 112 to support the load immediately after power on. In certain examples, the power converter system 200 continues to operate in the cold-boot state until acceptable input power (i.e., AC or DC) is detected. In other examples, the power converter system 200 is configured to transition out of the cold-boot state after a predetermined amount of time has elapsed.

In various examples, the power converter systems 100, 200 can experience a high-load transient state at the output 108. In one example, the high-load transient state refers to a condition at the output 108 that occurs when the battery 118 is tasked with quickly providing power to support a heavy load. As such, the high-load transient state may occur during certain operational states/modes and/or during a transfer between operational states/modes. For example, the high-load transient state can occur during a cold-boot state of the power converter systems 100, 200. In addition, the high-load transient state can occur while the power converter systems 100, 200 are switching between modes of operation (e.g., line/online to battery).

In certain examples, during a high-load transient state, the battery 118 attempts to provide a large current (e.g., several times larger than a normal load current) to the output 108. As a result, the battery 118 may fail or unintentionally shut off due to various safety features of the battery 118 such as over-current protection, over-temperature protection, over-voltage protection, etc. In certain examples, a battery management system (BMS) controller monitors the performance of the battery 118 and can trigger the various safety features accordingly. The BMS controller may be included in the battery 118 or provided externally. In addition, the battery 118 or other circuitry can even be damaged during a high-load transient state. For example, the large current provided by the battery 118 during a high-load transient state may exceed the current rating of wires, power traces, and/or other components (e.g., fuses, switches, etc.).

An improved power converter control method is provided herein. In at least one embodiment, the control method includes reducing a peak value of the output current of the power converter system in response to identifying an impending high-load transient state at the output. In some examples, the peak value of the output current is reduced by lowering the voltage of the DC bus and increasing the duty cycle of the inverter configured to provide the output current. By lowering the peak value of the output current during a high-load transient state, the undesired tripping of battery safety features can be avoided while still adequately supporting the load.

Figure 3:
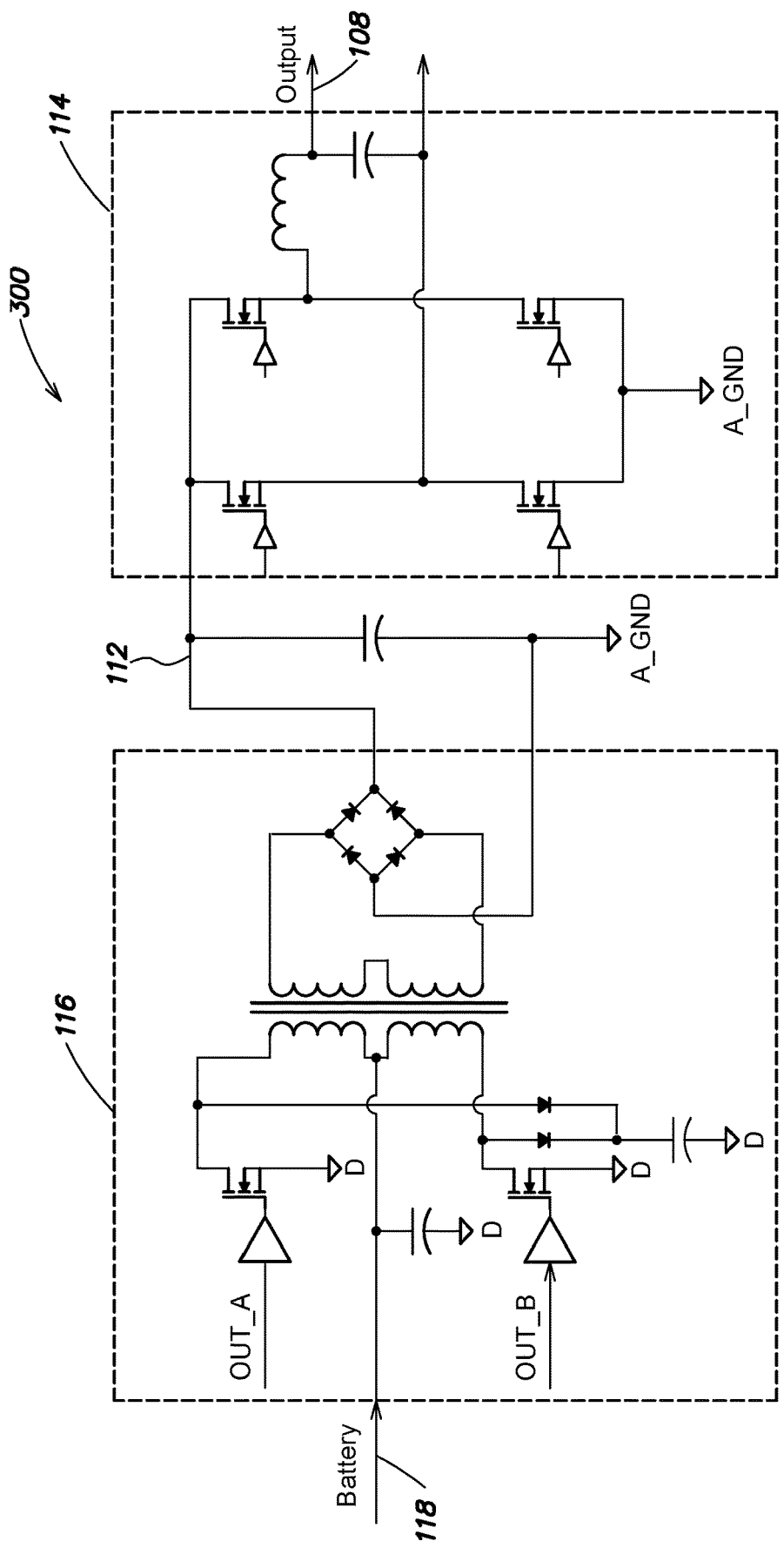
FIG. 3 is a schematic diagram of a power converter topology in accordance with aspect described herein.

FIG. 3 is a schematic diagram of a power converter topology 300 in accordance with aspects described herein. In one example, the power converter topology 300 corresponds to a portion of the power converter systems 100, 200 of FIGS. 1 and 2. For example, the power converter topology 300 can include the output 108, the DC bus 112, the inverter 114, the DC/DC converter 116, and the battery 118 of the power converter systems 100, 200. As shown, the DC/DC converter 116 may be configured as double conversion converter, where DC power is received from the battery 118, converted to AC power, and converted back to DC power before being provided to the DC bus 112. In other examples, the DC/DC converter 116 can be configured as a different type of converter (e.g., a buck-boost converter). In some examples, the controller 120 is configured to operate the power converter topology 300.

Figure 4A:
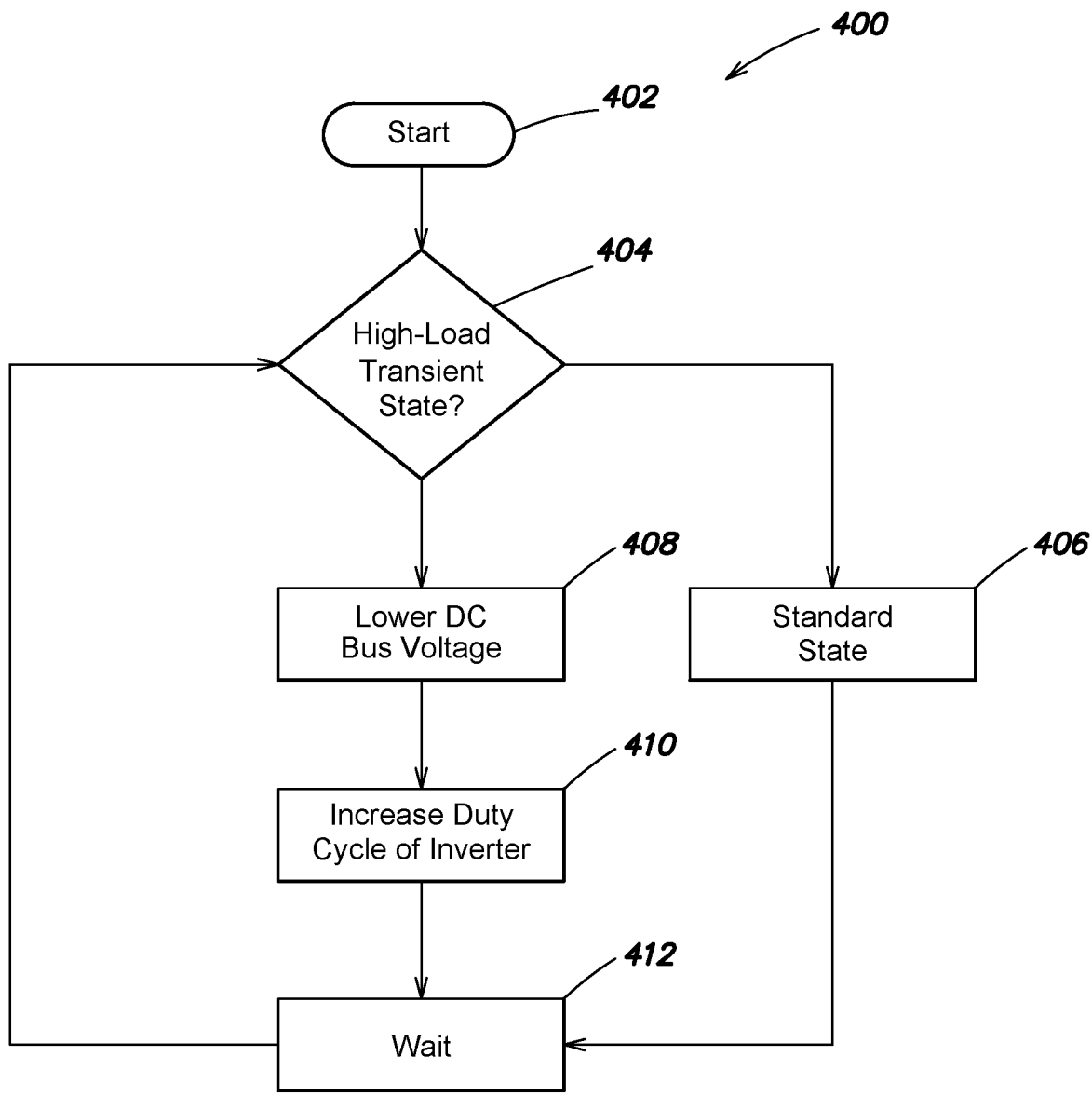
FIG. 4A is a flow chart diagram of a control method of a power converter topology in accordance with aspects described herein.

FIG. 4A is a flow chart illustrating a control method 400 in accordance with aspects described herein. In one example, the control method 400 corresponds to the operation of the power converter topology 300 within a power converter system (e.g., 100, 200). In some examples, the control method 400 includes operating the power converter topology 300 in various states during specific operational modes/states of the power converter systems 100, 200 (e.g., cold-boot state, backup mode of operation, etc.).

Figure 4B:
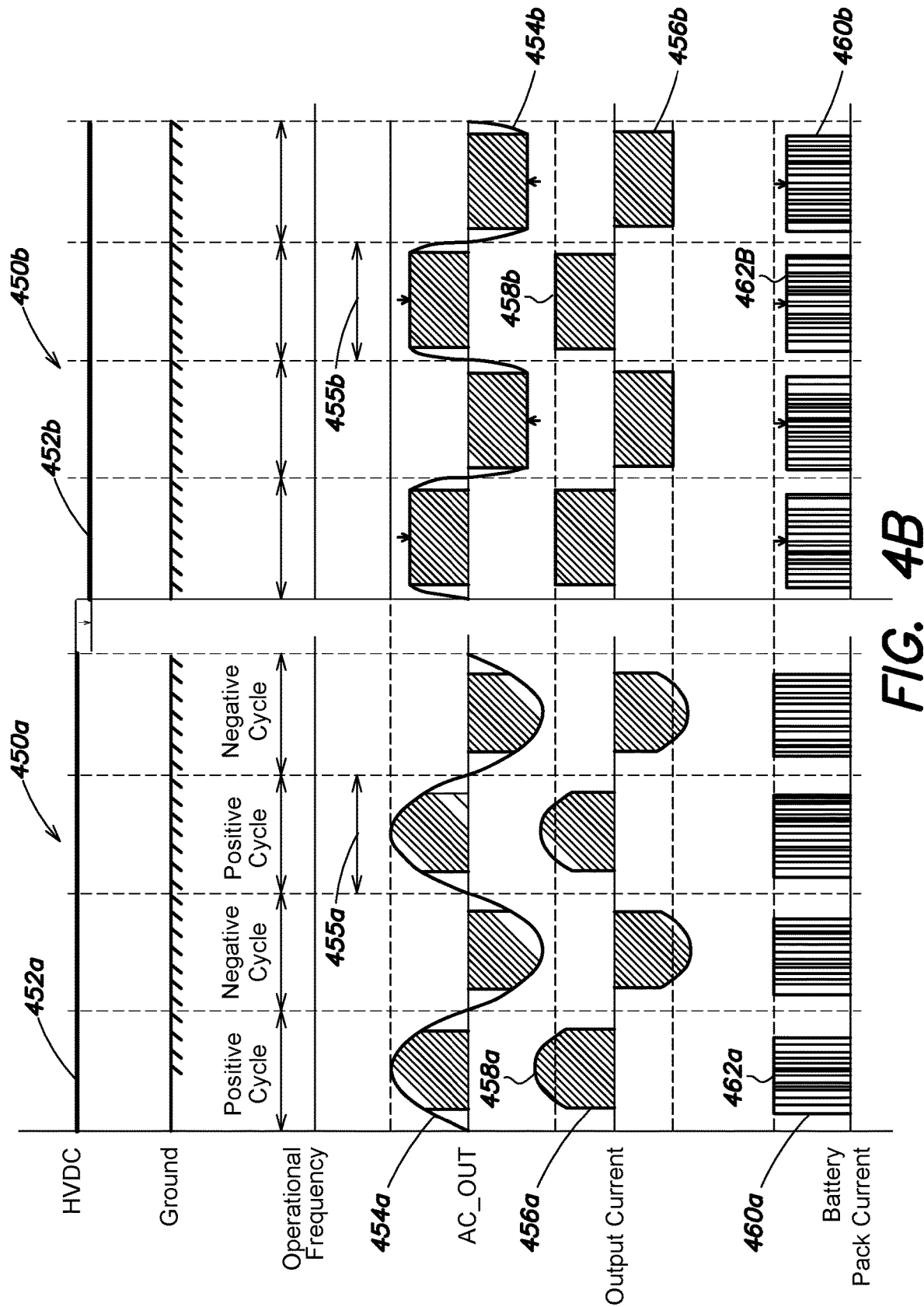
FIG. 4B is a graph of various waveforms associated with the operation of a power converter topology in accordance with aspects described herein.

FIG. 4B includes graphs 450*a* and 450*b* illustrating various states of the power converter topology 300 in accordance with aspects described herein. In one example, the graph 450*a* corresponds to a standard state of the power converter topology 300 and the graph 450*b* corresponds to a transient protection state of the power converter topology 300.

Returning to FIG. 4A, at block 402, the controller 120 initiates the control method 400. In one example, the controller 120 is configured to initiate the control method 400 prior to the power converter topology 300 being powered on and/or during operation of the power converter topology 300. For example, the control method 400 can begin before the power converter topology 300 (or the power converter system 100, 200) has been powered on. In other examples, the control method 400 is initiated prior to a transition of the power converter system 100, 200 from one mode of operation to another (e.g., line/online to backup).

At block 404, after initiating the control method 400, the controller 120 determines if the power converter topology 300 is at risk of experiencing a high-load transient state at the output 108. As described above, the output 108 of the power converter topology 300 (or system 100, 200) may be at risk of experiencing a high-load transient state during the cold-boot state or while transitioning between modes of operation. As such, the controller 120 can identify an impending high-load transient state at the output 108 based on a present or upcoming operational state of the power converter topology 300 (or mode of the system 100, 200). In other examples, the controller 120 monitors the output 108 to identify an impending high-load transient state at the output 108. For example, the controller 120 may detect a voltage drop and/or an increase in current draw at the output 108 and determine that the power converter topology 300 is at risk of experiencing a high-load transient state at the output 108. If an impending high-load transient state is identified, the controller 120 proceeds to block 408 and operates the power converter topology 300 in the transient protection state; otherwise, the controller 120 proceeds to block 406 and operates the power converter topology 300 in the standard state.

At block 406, the controller 120 operates the power converter topology 300 in the standard state. In one example, in the standard state, the controller 120 operates the DC/DC converter 116 to provide DC power derived from the battery 118 to the DC bus 112 having a nominal voltage level. For example, as shown in the graph 450*a* of FIG. 4B, the DC power provided by the DC/DC converter 116 in the standard state has a nominal voltage level 452*a*. In addition, the controller operates the inverter 114 with a nominal duty cycle 455*a* to convert the DC power from the DC bus 112 into output AC power. As shown in FIG. 4B, the inverter 114 provides output AC power including an output voltage 454*a* and an output current 456*a* having a peak current value 458*a*. As a result, in the standard state, a nominal battery current 460*a* having a peak current value 462*a* is drawn from the battery 118 to provide the output AC power to the output 108.

At block 412, the controller 120 continues to operate the power converter topology 300 in the standard state. In one example, the controller 120 is configured to wait for a predetermined time before returning to block 404 to determine if the power converter topology 300 is at risk of experiencing a high-load transient state at the output 108. For example, the controller 120 may wait for a predetermined time period (e.g., 10 secs) or a predetermined number of periods of the output AC power before returning to block 404. In other examples, the controller 120 is configured to proceed directly from block 406 to block 404.

At block 408, the controller 120 operates the power converter topology 300 in the transient protection state. In one example, in the transient protection state, the controller 120 operates the DC/DC converter 116 to provide DC power derived from the battery 118 to the DC bus 112 having a reduced voltage level. For example, as shown in the graph 450*b* of FIG. 4B, the DC power provided by the DC/DC converter 116 in the transient protection state has a reduced voltage level 452*b* that is lower than the nominal voltage level 452*a*. In addition, at block 410, the controller operates the inverter 114 with an increased (i.e., enlarged) duty cycle 455*b* to convert the DC power from the DC bus 112 into output AC power. As shown in FIG. 4B, the inverter 114 provides output AC power including an output voltage 454*b* and an output current 456*b* having a reduced peak current value 458*b* that is lower than peak current value 458*a*. As a result, in the transient protection state, a battery current 460*b* having a reduced peak current value 462*b* is drawn from the battery 118 to provide the output AC power and support the load coupled to the output 108. In some examples, by reducing the peak value of the battery current 460*b*, the battery 118 is protected from being damaged and/or from entering a preventive safety mode (e.g., over-current protection) during the high-load transient state at the output 108. As such, the occurrence of unwarranted disruptions (e.g., battery shutdowns) during operation of the power converter topology 300 (or systems 100, 200) can be reduced.

In addition, while the voltage level of the DC bus 112 and the peak output current value are reduced in the transient protection state, by operating the inverter 114 with the increased duty cycle, the RMS output power delivered to the output 108 in the transient protection state may be substantially the same as the RMS output power delivered to the output 108 in the standard state. As such, the power converter topology 300 may be transitioned between the standard and transient protection states as needed while continuously supporting the load coupled to the output 108.

At block 412, the controller 120 continues to operate the power converter topology 300 in the transient protection state. In one example, the controller 120 is configured to wait for the high-load transient state (or potential high-load transient state) to pass. In one example, the controller 120 can determine the high-load transient state has passed by waiting for a predetermined time (e.g., 10 secs). In some examples, the controller 120 can determine the high-load transient state has passed by waiting for a predetermined number of periods of the output AC power. In other examples, the controller 120 can monitor the output 108 to determine that the high-load transient state has passed. Once it has been determined that the high-load transient state has passed, the controller 120 returns to block 404 to monitor the risk of the power converter topology 300 experiencing a new high-load transient state at the output 108.

As described above, an improved power converter control method is provided herein. In at least one embodiment, the control method includes reducing a peak value of the output current of the power converter system in response to identifying an impending high-load transient state at the output. In some examples, the peak value of the output current is reduced by lowering the voltage of the DC bus and increasing the duty cycle of the inverter configured to provide the output current. By lowering the peak value of the output current during a high-load transient state, the undesired tripping of battery safety features can be avoided while still adequately supporting the load.

Having thus described several aspects of at least one embodiment of this invention, it is to be appreciated various alterations, modifications, and improvements will readily occur to those skilled in the art. Such alterations, modifications, and improvements are intended to be part of this disclosure and are intended to be within the spirit and scope of the invention. Accordingly, the foregoing description and drawings are by way of example only.

What is claimed is:

1. A power converter system, comprising:
   a DC bus;
   a DC/DC converter coupled to the DC bus;
   an inverter coupled to the DC bus and configured to convert DC power from the DC bus into output AC power having an output current;
   an output coupled to the inverter and configured to provide the output AC power to a load; and
   at least one controller configured to identify an impending high-load transient state at the output, and in response to identifying the impending high-load transient state, reduce a peak value of the output current of the output AC power by operating the DC/DC converter to reduce a voltage level on the DC bus and increasing a duty cycle of the inverter.

2. The power converter system of claim 1, wherein the DC/DC converter is coupled to a backup power source and is configured to provide DC power to the DC bus derived from the backup power source.

3. The power converter system of claim 2, further comprising an input configured to receive input power and a converter configured to convert the input power into DC power and provide the DC power to the DC bus.

4. The power converter system of claim 3, wherein the at least one controller is further configured to operate the power converter system in a first mode of operation by controlling the converter to provide DC power to the DC bus derived from the input power and a second mode of operation by controlling the DC/DC converter to provide DC power to the DC bus derived from the backup power source.

5. The power converter system of claim 4, wherein the high-load transient state at the output occurs during a transition of the power converter system between the first and second modes of operation.

6. The power converter system of claim 2, wherein the at least one controller is further configured to reduce the peak value of the output current to prevent the backup power source from exceeding a maximum current limit of the backup power source during the high-load transient state.

7. The power converter system of claim 2, wherein the high-load transient state at the output occurs during a cold-boot of the power converter system, the backup power source being configured to provide DC power to the DC bus during the cold-boot to support the load.

8. The power converter system of claim 1, wherein the at least one controller is further configured to determine that the high-load transient state has passed, and in response to determining that the high-load transient state has passed, increase the peak value of the output current by operating the DC/DC converter to increase the voltage level on the DC bus and reducing the duty cycle of the inverter.

9. The power converter system of claim 8, wherein the at least one controller is further configured to determine that the high-load transient state has passed by detecting that a predetermined amount of time has elapsed since identifying the impeding high-load transient state.

10. The power converter system of claim 9, wherein the predetermined amount of time corresponds to a predetermined number of periods of the output AC power.

11. The power converter system of claim 1, wherein the at least one controller is further configured to operate the DC/DC converter and the inverter to maintain a substantially constant RMS value of the output current while the peak value of the output current is reduced.

12. The power converter system of claim 1, wherein the power converter system is an Uninterruptible Power Supply (UPS).

13. A non-transitory computer-readable medium storing thereon sequences of computer-executable instructions for controlling a power converter system including a DC bus, a DC/DC converter coupled to the DC bus, and an inverter coupled to the DC bus, the sequences of computer-executable instructions including instructions that instruct at least one processor to:
    identify an impending high-load transient state at an output of the power converter system; and
    operate, in response to identifying the impending high-load transient state, the DC/DC converter to reduce a voltage level on the DC bus and the inverter with an increased duty cycle to reduce a peak value of an output current of the power converter system.

14. The non-transitory computer readable medium according to claim 13, wherein the sequences of instructions include instructions that cause the at least one processor to:
    determine that the high-load transient state has passed; and
    operate, in response to determining that the high-load transient state has passed, the DC/DC converter to increase the voltage level on the DC bus and the inverter with a reduced duty cycle to increase the peak value of the output current.

15. The non-transitory computer readable medium according to claim 14, wherein the sequences of instructions include instructions that cause the at least one processor to:
    determine that the high-load transient state has passed by detecting that a predetermined amount of time has elapsed since identifying the impeding high-load transient state.

16. The non-transitory computer readable medium according to claim 15, wherein the predetermined amount of time corresponds to a predetermined number of periods of the output AC power.

17. The non-transitory computer readable medium according to claim 13, wherein the sequences of instructions include instructions that cause the at least one processor to:
    operate the DC/DC converter and the inverter to maintain a substantially constant RMS value of the output current while the peak value of the output current is reduced.

18. The non-transitory computer readable medium according to claim 13, wherein the sequences of instructions include instructions that cause the at least one processor to:
    operate, in a first mode of operation, a converter to provide DC power to the DC bus derived from input power received at an input of the power converter system; and
    operate, in a second mode of operation, the DC/DC converter to provide DC power to the DC bus derived from backup DC power provided by a backup power source.

19. The non-transitory computer readable medium according to claim 18, wherein the sequences of instructions include instructions that cause the at least one processor to:
    identify an impending high-load transient state at the output corresponding to an upcoming transition of the power converter system between the first and second modes of operation.

20. The non-transitory computer readable medium according to claim 18, wherein the sequences of instructions include instructions that cause the at least one processor to:
    control the power converter system to operate in the second mode of operation during a cold-boot of the power converter system to support a load coupled to the output.

21. The non-transitory computer readable medium according to claim 20, wherein the sequences of instructions include instructions that cause the at least one processor to:
    identify an impending high-load transient state at the output corresponding to an upcoming cold-boot of the power converter system.

22. An Uninterruptible Power Supply (UPS), the UPS comprising:
    an input configured to receive input AC power;
    an output configured to provide output AC power having an output current to a load;
    a backup power input configured to receive backup DC power from a backup power source;
    a DC/DC converter coupled to the backup power input and configured to convert the backup DC power into DC power;
    a DC bus coupled to the DC/DC converter and configured to receive DC power from the DC/DC converter;
    an inverter coupled to the output and configured to convert DC power from the DC bus into the output AC power; and
    at least one controller configured to identify an impending high-load transient state at the output, and in response to identifying the impending high-load transient state, reduce a peak value of the output current of the output AC power by operating the DC/DC converter to reduce a voltage level on the DC bus and increasing a duty cycle of the inverter.

23. The UPS of claim 22, wherein the DC/DC converter is configured to convert the backup DC power into DC power having one of a first voltage level and a second voltage level, the first voltage level being lower than the second voltage level, wherein the inverter is configured to operate with at least a first duty cycle and a second duty cycle, the first duty cycle being higher than the second duty cycle, and wherein operating the DC/DC converter to reduce the voltage level on the DC bus includes controlling the DC/DC converter to provide DC power having the first voltage level and increasing the duty cycle of the inverter includes controlling the inverter to operate with the first duty cycle.

* * * * *